United States Patent [19]

Muller

[11] Patent Number: 4,608,752

[45] Date of Patent: Sep. 2, 1986

[54] APPARATUS, METHOD OF OPERATING APPARATUS AND METHOD OF ASSEMBLING A ROTATABLE ASSEMBLY

[75] Inventor: Alexander Muller, Holland, Mich.

[73] Assignee: General Electric Company, Fort Wayne, Ind.

[21] Appl. No.: 593,840

[22] Filed: Mar. 27, 1984

[51] Int. Cl.$^4$ ............................................. H02K 15/02
[52] U.S. Cl. ......................................... 29/598; 29/732
[58] Field of Search .................. 29/598, 732; 310/152, 310/156, 42, 46, 218, 262, 271

[56] References Cited

U.S. PATENT DOCUMENTS

| | | | |
|---|---|---|---|
| 3,221,194 | 11/1965 | Blackburn | 310/156 |
| 3,531,670 | 9/1970 | Loudon | 310/156 |
| 4,199,861 | 4/1980 | Buckman et al. | 310/42 |
| 4,443,934 | 4/1984 | Hickey | 29/732 |

FOREIGN PATENT DOCUMENTS 664902 1/1952 United Kingdom ................ 310/156

*Primary Examiner*—Howard N. Goldberg
*Assistant Examiner*—P. W. Echols
*Attorney, Agent, or Firm*—Ralph E. Krisher, Jr.

[57] ABSTRACT

In a method of assembling a rotatable assembly, a rotor core is disposed with its circumferential surface coaxial with a reference axis, and arcuate outer surfaces of a set of magnet material elements are located in preselected positions generally concentrically about the reference axis. With the arcuate outer surfaces located in the preselected positions, the magnet material elements are then arranged with respect to the rotor core so that the arcuate outer surfaces located in the preselected positions define a predetermined outside diameter of the rotatable assembly, and the arcuate inner surfaces of the magnet material elements are in spaced apart relation from the circumferential surface of the rotor core at least within a preselected spatial range.

Apparatus and a method of operating apparatus are also disclosed.

36 Claims, 15 Drawing Figures

|  | SEGMENTS ARC LENGTHS | | |
|---|---|---|---|
| FIG. 8A PRIOR ART | 120°<br>120°<br>120° |  |  FIG. 9A |
| GAPS → | | 0,0,0 | 0,0,0 |
| FIG. 8B PRIOR ART | 117°<br>120°<br>117° |  |  FIG. 9B |
| GAPS → | | 6,0,0 | 3,1.5,1.5 |
| FIG. 8C PRIOR ART | 120°<br>120°<br>117° |  |  FIG. 9C |
| GAPS → | | 3,0,0 | 1.5,0,1.5 |
| FIG. 8D PRIOR ART | 117°<br>117°<br>117° |  |  FIG. 9D |
| GAPS → | | 9,0,0 | 3,3,3 |

4,608,752

APPARATUS, METHOD OF OPERATING APPARATUS AND METHOD OF ASSEMBLING A ROTATABLE ASSEMBLY

FIELD OF THE INVENTION

This application relates in general to dynamoelectric machines and in particular to an improved method of assembling a rotatable assembly, an improved apparatus for assembling a rotatable assembly, an improved method of operating the apparatus.

BACKGROUND OF THE INVENTION

In the past, various different methods have been utilized to secure arcuate shaped magnet material elements formed of a frangible material to a circumferential surface of a rotor core. In one of these past methods, the rotor core was provided with protrusions which were associated in displacement-preventing engagement with the arcuate magnet material elements to maintain them in place seated against the circumferential surface of the rotor core. In another of the past methods, a fiber, plastic or metallic wrap or sleeve was provided enveloping at least the arcuate outer surfaces of the magnet material elements to maintain the magnet material elements against displacement from their seated engagement with the circumferential surface of the rotor core.

In still another of the aforementioned past methods of securing arcuate magnet material elements to a rotor core, a hardenable adhesive material was applied to at least one of the circumferential surfaces of the rotor core and the arcuate inner surfaces of the magnet material elements. After such application of the hardenable adhesive material, the arcuate inner surfaces of the magnet material elements were seated or abutted against the circumferential surface of the rotor core, and in this position, the permanent magnet material elements and the circumferential surface of the rotor core were merely clamped together until the hardenable adhesive material set or hardened, to adhere together the magnet material elements and the circumferential surface of the rotor core. Since both the arcuate inner surfaces of the magnet material elements and the circumferential surface of the rotor core may have high points or areas due to tolerance variations during manufacture, the arcuate inner surfaces of magnet material elements and the circumferential surface rotor core were at least in part in surface-to-surface engagement with each other; due at least in part to such aforementioned surface-to-surface engagement, it is believed that one of the disadvantageous or undesirable features of this past method was that some of the frangible arcuate magnet material elements fractured or cracked when pressure or force was applied to clamp them against the rotor core. Since the high points or areas on the arcuate inner surfaces of the magnet material elements and the circumferential surface of the rotor core effected by the aforementioned tolerance variations were clamped directly into the aforementiond surface-to-surface engagement, another disadvantageous or undesirable feature of this past method is believed to be that dependable, uniform bond strengths of the hardenable adhesive material could not be attained between the arcuate inner surfaces of the magnet material elements and the circumferential surface of the rotor core. Due to this nonuniformity of bond strength, it is also believed that the rotor assemblies fabricated by this past method may have been acceptable for use in low speed motor applications, such as ceiling fans, for instance, but might not have been acceptable in relatively high speed motor applications, such as clothes washers and various hermetic motor applications. Additionally, it is further believed that another disadvantageous or undesirable feature of rotatable assemblies fabricated by the past method was that the outside diameter or circumference was not constant, since the radial distance between the circumferential surface of the rotor core and the arcuate outer surface of each permanent magnet material element may have varied due to the aforementioned tolerance buildup. While the prior art rotatable assemblies believed to have the above discussed disadvantageous feature may have been acceptable for some relatively low speed motor applications, it is believed that they may be too far out of balance for use in a motor application of relatively high speeds, for instance, at least nine thousand revolutions per minute (9000 rpm). Also with respect to the prior art rotatable assemblies believed to have the above discussed disadvantageous feature, it is believed that a flux gap between a stator bore and the outer arcuate surfaces of the permanent magnet material elements on such prior art rotatable assemblies may have been deleteriously affected. Furthermore, it is also believed that another disadvantageous or undesirable feature of rotatable assemblies manufactured by this past method was that the arc lengths of the permanent magnet material elements may not have been evenly distributed about the circumferential surface of the rotor core, also to effect a too far out of balance rotatable assembly for use in the aforementioned higher speed motor applications.

SUMMARY OF THE INVENTION

Among the several objects of the present invention may be noted the provision of an improved method of assembling a rotatable assembly, an improved apparatus for assembling a rotatable assembly and an improved method of operating apparatus for assembling a rotatable assembly which overcome the above discussed disadvantageous or undesirable features, as well as others, of the prior art; the provision of such improved apparatus, and methods in which a rotor core and a set of arcuate magnet material elements comprising the rotatable assembly are predeterminately spaced from each other; the provision of such improved apparatus and methods in which the arcuate inner surfaces of the magnet material elements are spaced within a preselected spatial range from a circumferential surface of a rotor core; the provision of such improved apparatus and method in which a uniform bond strength is attained between the magnet material elements and the rotor core; the provision of such improved apparatus and methods in which a hardenable adhesive material at least fills the space established between the arcuate inner surfaces of the magnet material elements and the circumferential surface of the rotor core; the provision of such improved apparatus and methods in which the arcuate outer surfaces of the magnet material elements define a predetermined outer diameter of the rotatable assembly which is uniform or constant and easily controlled irrespective of tolerance build-ups or differences in the magnet material elements and the rotor core; the provision of such improved apparatus and methods in which the arcuate lengths of the permanent magnet material elements are more evenly distributed about the circumferential surface of the rotor core; and the provision of such improved apparatus and methods in which the components utilized are simplistic in design, easily assembled and economically manufactured. These as well as other objects and advantageous features of the present invention will be in part apparent and in part pointed out hereinafter.

In general and in one form of the invention, a method is provided for assembling a rotatable assembly for a dynamoelectric machine with respect to a reference axis. The rotatable assembly has a preselected outside diameter and includes a rotor core having a circumferential surface, and a set of magnet material elements having generally arcuate inner and outer surfaces, respectively. The rotatable assembly also has a preselected spatial range between the circumferential surface of the rotor core and the arcuate inner surfaces of the magnet material elements, respectively. In practicing this method, the rotor core is disposed so that the circumferential surface is at least generally coaxial with the reference axis, and the arcuate outer surfaces of the magnet material elements are located in preselected positions at least generally concentrically about the reference axis with the arcuate inner surfaces of the magnet material elements facing the circumferential surface of the rotor core, respectively. The arcuate outer surfaces of the magnet material elements are arranged while located in the preselected positions with respect to the rotor core so as to define the preselected outside diameter of the rotatable assembly, and the arcuate inner surfaces of the magnet material elements are located in spaced apart relation from the circumferential surface of the rotor core at least within the preselected spatial range, respectively.

Also in general, apparatus is provided in one form of the invention for assembling a rotatable assembly for use in a dynamoelectric machine. The rotatable assembly includes a rotor core having a circumferential surface and secured about a shaft therefor with the rotor core and shaft having a rotational axis, a set of magnet material elements respectively having generally arcuate inner and outer surfaces, and a hardenable adhesive material disposed on at least one of the arcuate inner surfaces of the magnet material elements and the circumferential surface of the rotor core, respectively. The apparatus comprises mounting means having a preselected axis for locating engagement with a part of the shaft so as to generally align the rotational axis of the rotor core and shaft with the preselected axis, and a set of means is operable generally for advancing the magnet material elements toward assembly positions to space the arcuate inner surfaces within a preselected spatial range from the circumferential surface of the rotor core with the hardenable adhesive material at least filling the space between when the shaft part is in the locating engagement with the mounting means. The advancing means includes a set of means for seating the arcuate outer surfaces of the magnet material elements is located positions generally coaxially about the preselected axis, respectively.

Further in general and in one form of the invention, a method is provided for operating apparatus for assembling a rotatable assembly for use in a dynamoelectric machine. The rotatable assembly has a predetermined outside diameter and includes a rotor core having a circumferential surface and secured about a shaft with the rotor core and shaft having a rotational axis, and a set of magnet material elements respectively having generally arcuate inner and outer surfaces. The apparatus has a mounting device with a preselected axis, and a set of means for movement generally radially with respect to the preselected axis between retracted and advanced positions. The movable means includes a set of arcuate seats sized to define the predetermined outside diameter of the rotatable assembly, and a set of jaws movable on the segments. In practicing this method, a part of the shaft is associated with the mounting device, to at least generally align the rotational axis of the rotor core and shaft with the preselected axis of the mounting device. The magnet material elements are placed on the segments with the arcuate outer surfaces at least adjacent the arcuate seats on the segments and with the arcuate inner surfaces of the magnet material elements arranged generally in facing relation with the circumferential surface of the rotor core when the segments are in the retracted positions, respectively. The jaws are moved to engage the magent material elements, and thereby the arcuate outer surfaces of the magnet material elements are urged into located engagement with the arcuate seats on the segments, respectively. The segments are driven from the retracted positions thereof generally radially with respect to the preselected axis toward the advanced positions of the segments, and the arcuate inner surfaces of the magnet material elements are spaced within a preselected spatial range from the circumferential surface of the rotor core when the segments are in the advanced positions, respectively.

BRIEF DESCRIPTION OF THE DRAWINGS

Corresponding reference characters indicate parts throughout the several views of the drawings.

The exemplifications set out herein illustrate the preferred embodiments of the invention in one form thereof, and such exemplifications are not to be construed as limiting either the scope of the disclosure or the scope of the invention in any manner.

DETAILED DESCRIPTION OF THE PREFERRED EMBODIMENTS

Figure 1:
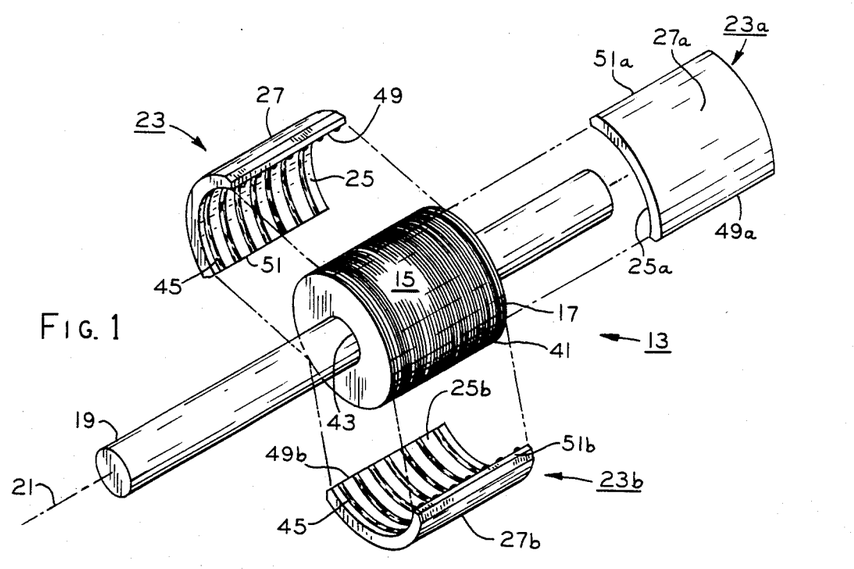
FIG. 1 is an exploded isometric view of a rotatable assembly.
Figure 2:
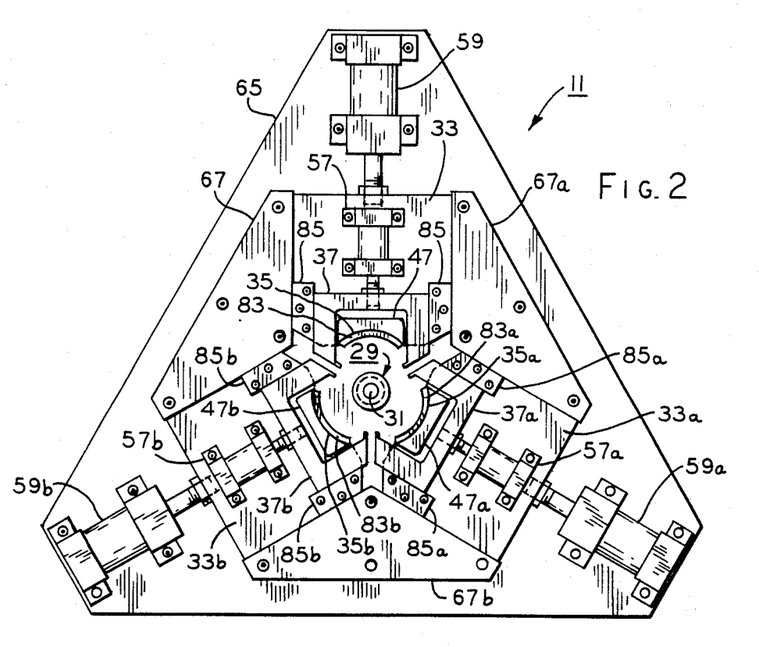
FIG. 2 is a plan view partially in section showing apparatus in one form of the invention for assembling the rotatable assembly of FIG. 1 and illustrating principles which may be utilized in both a method of operating the apparatus and a method of assembling the rotatable assembly in one form of the invention, respectively.
Figure 3:
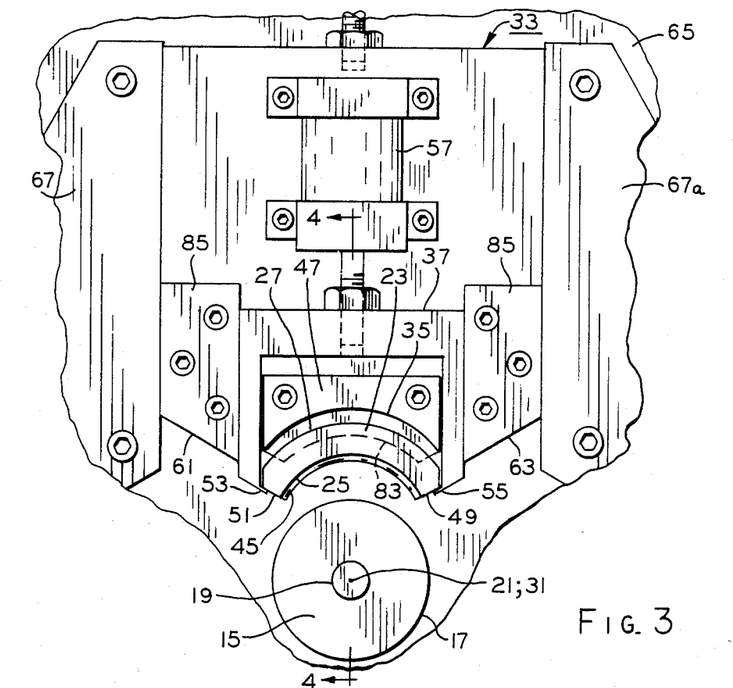
FIG. 3 is an enlarged partial view taken from FIG. 1 showing a set of segments of the apparatus supporting a set of magnet material elements with respect to a rotor core and shaft disposed in the apparatus.
Figure 4:
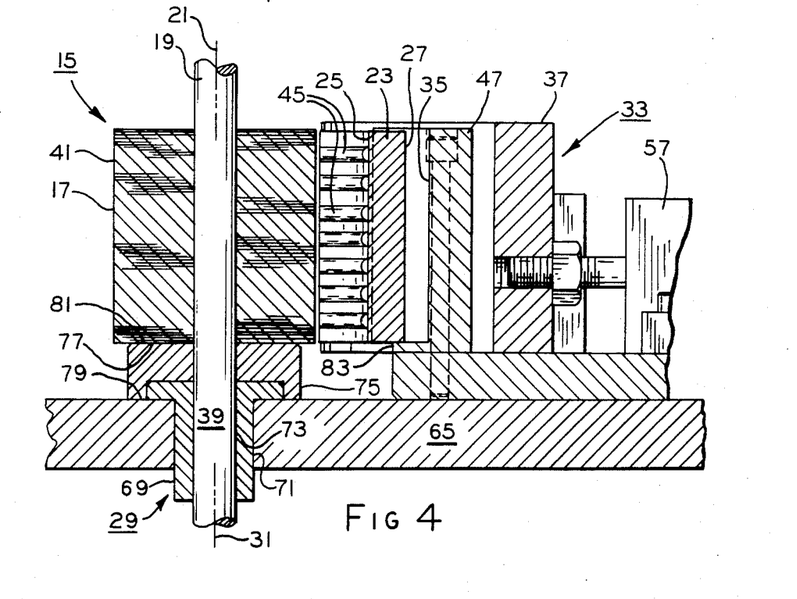
FIG. 4 is a partial sectional view taken along line 4—4 in FIG. 3.
Figure 5:
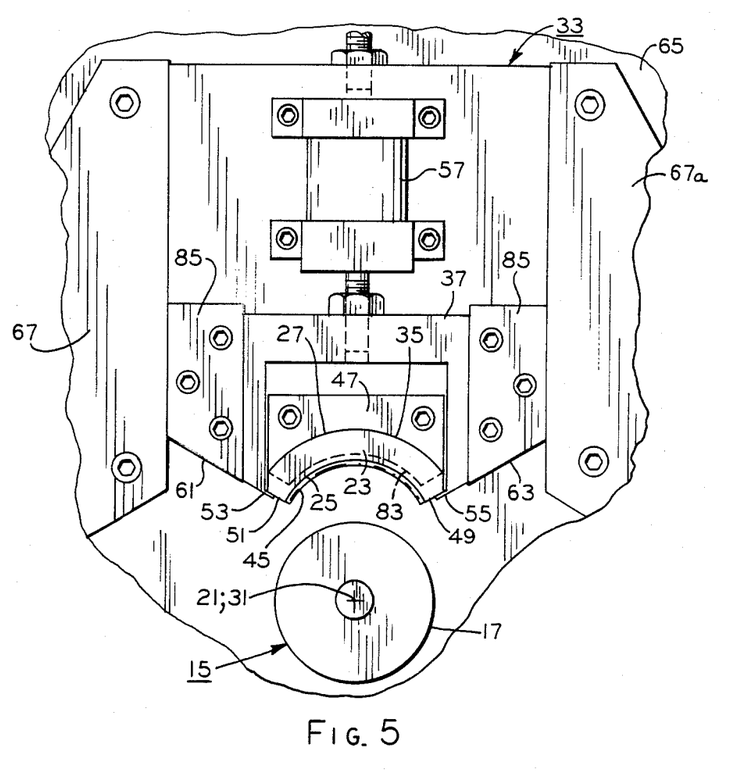
FIG. 5 is generally the same as FIG. 3 but showing the magnet material elements disposed in a preselected located position on the segments.
Figure 6:
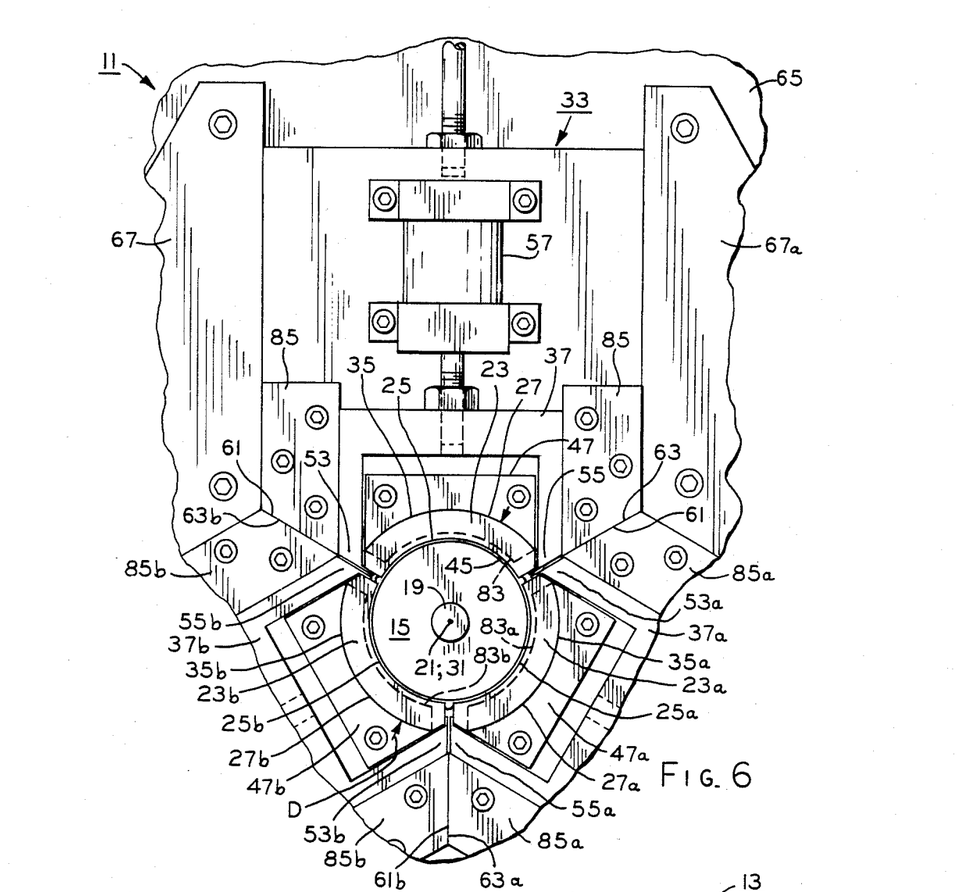
FIG. 6 is also generally the same as FIG. 3 and illustrating the segments in their advanced positions so as to locate the magnet material elements with respect to a circumferential surface of the rotor core.
Figure 7:
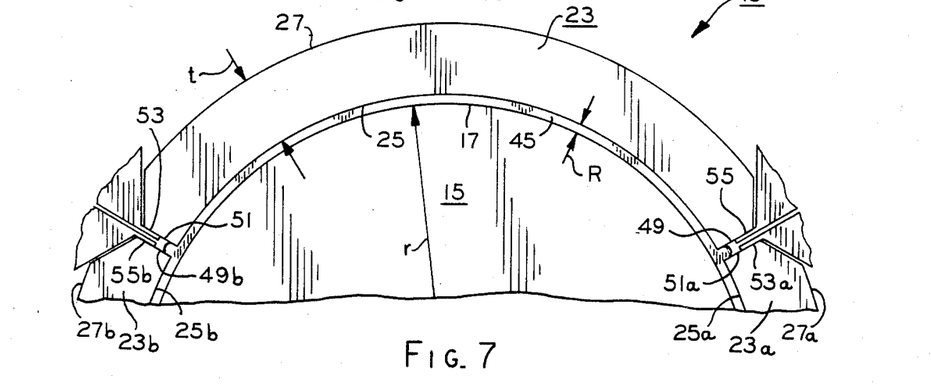
FIG. 7 is an enlarged partial view taken from FIG. 6 illustrating an arcuate inner surface of one of the magnet material elements in its predetermined spaced apart relation with respect to the circumferential surface of the rotor core with an arcuate outer surface of such magnet material element in its located position predeterminately defining a preselected outer diameter of the rotatable assembly.

With reference to the drawings in general, there is illustrated in one form of the invention a method of operating apparatus 11 for assembling a rotatable assembly 13 for use in a dynamoelectric machine (not shown) (FIGS. 1–7). Rotatable assembly 13 has a predetermined outside diameter D and includes a rotor core 15 having a radius r and a circumferential surface 17 with the rotor being secured about a shaft 19 with the rotor core and shaft having a rotational or central axis 21, and a set of magnet material elements 23, 23a, 23b having arcuate inner surfaces or faces 25, 25a, 25b and arcuate outer surfaces or faces 27, 27a, 27b radially spaced apart a distance representing a thickness (t) (FIGS. 1 and 6). Apparatus 11 has a mounting device 29 with a preselected or reference axis 31 and a set of means, such as segments 33, 33a, 33b or the like, for instance, for radial movement with respect to the preselected axis between retracted and advanced or assembly positions (FIGS. 2, 3 and 6). Movable means or segments 33, 33a, 33b include a set of arcuate seats or locating surfaces 35, 35a, 35b sized to define the predetermined outside diameter D of rotatable assembly 13, and a set of jaws or jaw pairs 37, 37a, 37b are movable on the segments, respectively (FIG. 2). In practicing this method, a part or end portion 39 of shaft 19 is received in or otherwise associated with mounting device 29 of apparatus 11, to at least generally align the rotational axis 21 of rotor core 15 and the shaft with preselected axis 31 of the mounting device (FIG. 4). Magnet material elements 23, 23a, 23b are placed on otherwise arranged on segments 33, 33a, 33b with arcuate outer surfaces 27, 27b, 27c of the magnet material elements at least adjacent arcuate seats 35, 35a, 35b on the segments and with arcuate inner surfaces 25, 25a, 25b of the magnet material elements arranged in facing relation with circumferential surface 17 of rotor core 15 when the segments are in the retracted positions (FIG. 2). Jaws or yokes 37, 37a, 37b are moved to engage magnet material elements 23, 23a, 23b, and arcuate outer surfaces 27, 27a, 27b are urged or biased into locating engagement with arcuate seats 35, 35a, 35b on segments 33, 33a, 33b, respectively (FIG. 5). Segments 33, 33a, 33b are driven or otherwise moved from the retracted positions radially with respect to preselected axis 31 toward the advanced positions of the segments, respectively (FIG. 6). In the advanced positions of segments 33, 33a, 33b, arcuate inner surfaces 25, 25a, 25b of magnet material elements 23, 23a, 23b are spaced within a preselected spatial range R from circumferential surface 17 of rotor core 15, respectively (FIGS. 6 and 7).

More particularly and with specific reference to FIG. 1, rotor core 15 of rotatable assembly 13 includes a plurality of rotor laminations 41 which may be interconnected into a stack by suitable means, such as welding or an interlocking tab construction (not shown), to form the rotor core having generally cylindric circumferential surface 17. An opening or bore 43 through the lamination stack of rotor core 15 may be mounted or otherwise secured about shaft 19 by suitable means, such as heat shrinking or press-fitting. While rotor core 15 is illustrated for purposes of disclosure, it is contemplated that various other rotor cores having various different constructions and mounted onto a shaft by various other methods or constructions may be utilized within the scope of the invention so as to meet at least some of the objects.

In a preferred form of the invention, a preselected amount of a hardenable adhesive material 45 is applied in the illustrated beaded pattern onto arcuate inner surfaces 25, 25a, 25b l of magnet material elements 23, 23a, 23b prior to the disposition in apparatus 11, and an activator (not shown) for the hardenable adhesive material may be applied by suitable means, such as spraying or the like, onto circumferential surface 17 of rotor core 15 when it is mounted in the apparatus, as discussed in greater detail below. While hardenable adhesive material 45 and activator discussed herein is Loctite 325 available from Loctite Corporation, Newington, Conn., it is contemplated that various other hardenable adhesive materials may be utilized with or without activators within the scope of the invention so as to meet at least some of the objects. Furthermore, although hardenable adhesive material 45 is illustrated as applied in a preselected amount and in a beaded pattern onto magnet material elements 23, 23a, 23b, it is contemplated that random amounts of the hardenable adhesive material may be applied in various other patterns or in a coat onto either the magnet material elements or the circumferential surface of the rotor core or both within the scope of the invention so as to meet at least some of the objects.

End portion 39 of shaft 19 is manually placed or otherwise associated in locating engagement with mounting device or mounting means 29 of apparatus 11, and the locating engagement of the shaft end portion with the mounting device at least generally aligns rotational axis 21 of rotor core 15 and shaft 19 with preselected axis 31 of the mounting device, as best seen in FIG. 4. In this manner, circumferential surface 17 of rotor core 15 is disposed generally coaxially about preselected axis 31 in apparatus 11 and arranged concentrically in radially spaced relation with arcuate seats 35, 35a, 35b on segments 33, 33a, 33b when the segments are in the retracted positions. it may be noted that the arcs and spans of arcuate seats 35, 35a, 35b are predeterminately formed to define the predetermined outside diameter D of rotatable assembly 13 when segments 33, 33a, 33b are in their advanced positions locating the seats with respect to each other, as discussed in greater detail hereinafter.

With hardenable adhesive material 45 applied onto arcuate inner surfaces 25, 25a, 25b of magnet material elements 23, 23a, 23b, as previously discussed, the magnet material elements are manually placed or arranged in a set of means, such as for instance, holders 47, 47a, 47b or the like, for receiving or supporting them on segments 33, 33a, 33b when the segments are in the retracted positions, respectively, and arcuate seats 35, 35a, 35b are integral with the holders or receiving means, as best seen in FIG. 3. Upon the placement of magnet material elements 23, 23a, 23b into holders 47, 47a, 47b on segments 33, 33a, 33b, arcuate outer surfaces 27, 27a, 27b of the magnet material elements are at least adjacent arcuate seats 35, 35a, 35b in facing relation, and arcuate inner surface 25, 25a, 25b of the magnet material elements are disposed in facing relation with circumferential surface 17 of rotor core 15 in its located position with rotational axis 21 of rotor core 15 and shaft 19 aligned with preselected axis 31 of apparatus 11, respectively. Although magnet material elements 23, 23a, 23b are disclosed as being manually placed into holders 47, 47a, 47b, it is contemplated that various different transfer or robotic devices may be associated with apparatus 11 for automatically loading or feeding the magnetic material elements into the holders within the scope of the invention so as to meet at least some of the objects.

Magnet material elements 23, 23a, 23b may be formed of a frangible ferrite ceramic material and are available from Crucible Magnetics Division of Colt Industries, Elizabethtown, Ky. While magnet material elements 23, 23a, 23b are illustrated for purposes of disclosure, it is contemplated that various other magnet material elements of different configurations and formed of different materials may be utilized within the scope of the invention so as to meet at least some of the objects. Further, in a preferred form of the invention, magnet material elements 23, 23a, 23b are not magnetized until after the assembly of rotatable assembly 13 is completed. Magnet material elements 23, 23a, 23b are provided with a pair of generally radially extending opposite side or marginal edges 49, 49a, 49b and 51, 51a, 51b which are interposed between arcuate inner surfaces 25, 25a, 25b and arcuate outer surfaces 27, 27a, 27b of the magnet material elements, to define the arcuate length, as best seen in FIG. 1, and when the magnet material elements are loaded into holders 47, 47a, 47b on segments 33, 33a, 33b, the opposite marginal edges of the magnet material elements are disposed at least adjacent and in facing relation with a pair of generally opposed flanges or abutments 53, 53a, 53b and 55, 55a, 55b provided on jaws 37, 37a, 37b, respectively, as best seen in FIG. 3. It may be noted that the curvature or radius of arcuate locating surfaces 35, 35a, 35b generally correspond to those of arcuate outer surfaces 27, 27a, 27b of magnet material elements 23, 23a, 23b, and the arcuate length of the arcuate surfaces is predeterminately less than that of the magnet material elements. With magnet material elements 23, 23a, 23b so loaded into holders 47, 47a, 47b, as discussed above, a set of actuators or actuating means, such as double-acting air cylinders 57, 57a, 57b or the like, mounted on segments 33, 33a, 33b are operated to effect the generally conjoint movement of jaws 37, 37a, 37b from at-rest positions toward locating positions thereof relative to the segments and holders 47, 47a, 47b respectively, as best seen in FIG. 5. In response to this conjoint movement of jaws 37, 37a, 37b toward their locating positons, opposed flanges 53, 53a, 53b and 55, 55a, 55b on the jaws engage opposite marginal edges 49, 49a, 49b and 51, 51a, 51b of magnet material elements 23, 23a, 23b and urge arcuate outer surfaces 27, 27a, 27b of the magnet material elements into locating engagement with arcuate seats 35, 35a, 35b on holders 47, 47a, 47b, respectively. Of course, the locating engagement of opposed flanges 53, 53a, 53b and 55, 55a, 55b with opposite marginal edges 49, 49a, 49b and 51, 51a, 51b of magnet material elements 23, 23a, 23b is effective to move or adjust arcuate outer surfaces 27, 27a, 27b generally about or on arcuate locating surfaces 35, 35a, 35b of holders 47, 47a, 47b thereby to at least generally align the center of the arcuate length of the magnet material elements with the center of the arcuate length of the arcuate locating surfaces. In this manner, magnet material elements 23, 23a, 23b are disposed in a preselected position with respect to holders 47, 47a, 47b, and aligned centers of the arcuate lengths of the magnet material elements and arcuate locating surfaces 35, 35a, 35b are also in radial alignment with preselected reference axis 31 of mounting device 29. It may be noted that the locating engagement between arcuate outer surfaces 27, 27a, 27b of magnet material elements 23, 23a, 23b and arcuate seats 35, 35a, 35b may not be flush since the arcuate outer surface may have high points or areas thereon due to manufacturing tolerance variations in the magnet material elements; however, such locating engagements between the arcuate seats and the arcuate outer surfaces of the magnet material elements determine the effective outside diameter D of rotatable assembly 13 which will be uniform and controlled within close tolerances, as discussed in greater detail hereinafter. Further, it may also be noted that the forces exerted by actuators 57, 57a, 57b on jaws 37, 37a, 37b to effect the locating engagement of arcuate outer surfaces 27, 27a, 27b of magnet material elements 23, 23a, 23b with arcuate seats 35, 35a, 35b therefor are relatively light being great enough to assure such locating engagement but not to fracture or effect cracking or chipping of the magnet material elements. While actuators 57, 57a, 57b are disclosed herein as being double-acting air cylinders, it is contemplated that various other actuators of different types may be utilized to effect the movement of jaws 37, 37a, 37b between their at-rest and locating positions within the scope of the invention so as to meet at least some of the objects.

Figure 8A:
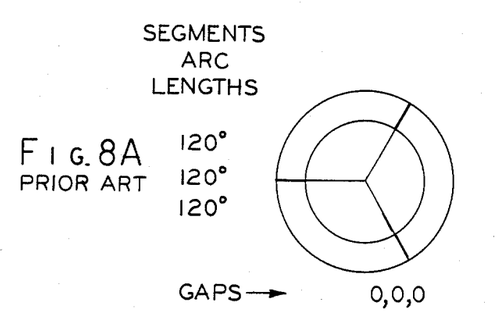
FIGS. 8A–8D and 9A–9D are respectively schematic representations illustrating the spacing of gaps which may occur due to tolerance variation in the arc lengths of the magnet material elements when the magnet material elements are predeterminately located with respect to the rotor in the present invention as compared with such gaps which may occur in the prior art assembly of magnet material elements to the rotor without such predetermined location.
Figure 8B:
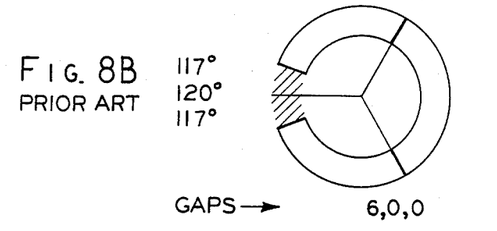
Figure 8C:
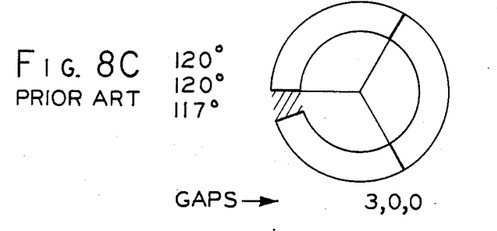
Figure 8D:
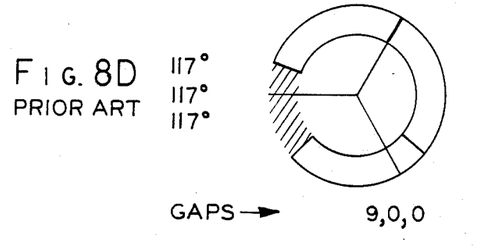
Figure 9A:
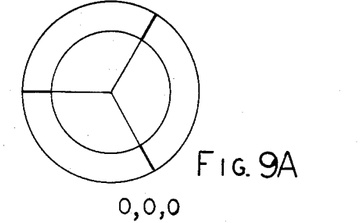
Figure 9B:
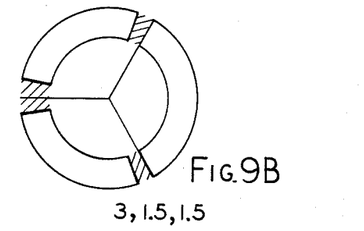
Figure 9C:
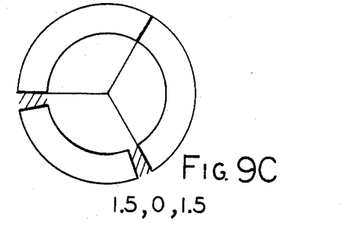
Figure 9D:
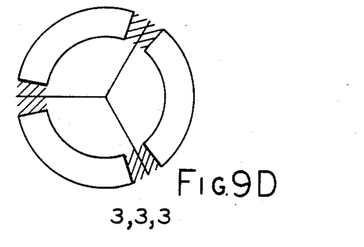

With reference to FIGS. 8A-8D and 9A-9D, assume by way of example that the arcuate lengths between opposite marginal edges 49, 49a, 49b and 51, 51a, 51b of magnet material elements 23, 23a, 23b vary from a maximum of 120° to a minimum of 117° thereby to have a tolerance variation of 3°. Theoretically, of course, if the arcuate length of all these magnet material elements is 120°, as indicated, the magnet material elements should occupy the entire 360° circumference of rotor 15 with the opposite marginal edges of the magnet material elements touching or engaging each other. It may be argued that the no gap situation of FIGS. 8A and 9A would never really occur due to the tolerance variation, but the fact remains that if no means is provided to prevent such a gap distribution, then it might occur. For convenience of discussion with respect to FIGS. 8B-8D and 9B-9D, a worst case gap distribution is shown, with the gaps being accentuated for purpose of drawing simplicity. In FIGS. 8B and 9B, if two of the magnet material elements have minimum arcuate lengths while one has a maximum arcuate length, then a gap of 6° may occur between magnet material elements in the FIG. 8B illustration; however, in comparison, the maximum gap in the FIG. 9B illustration is only 3° with the other two gaps being 1.5°. In FIGS. 8C and 9C, if two of the magnet material elements have maximum arcuate lengths while one has a minimum arcuate length, then a gap of 3° may occur in the FIG. 8C illustration; however, in comparison therewith two maximum gaps of 1.5° may occur with one of the gaps being 0.0°. In FIGS. 8D and 9D, if all these of the magnet material elements have minimum arcuate lengths of 117°, then a gap of 9° may occur between two of the magnet material elements in the FIG. 8D illustration; however, in comparison therewith, the gaps in the FIG. 9D illustration would be 3° evenly distributed between the magnet material elements. Thus, in the light of the foregoing worst case illustrations, it may be noted that when magnet material elements 23, 23a, 23b in their predetermined locations on holders 37, 37a, 37b are arranged in association with circumferential surface 17 of rotor 15, the centering of the arcuate lengths of the magnet material elements on the holders serves to distribute more uniformly the gaps between opposite marginal edges 49, 49a, 49b and 51, 51a, 51b between the magnet material elements.

With magnet material elements 23, 23a, 23b in the located positions thereof on segments 33, 33a, 33b, another set of actuators or actuating means, such as double-acting air cylinders 59, 59a, 59b or the like, may be operated to effect the generally conjoint driving or movement of the segments in radial directions with respect to preselected axis 31 of apparatus 11 from the retracted positions of the segments toward the advanced or protracted positions, respectively, as best seen in FIG. 6. Segments 33, 33a, 33b are provided with a pair of generally opposite abutments or abutment means 61, 61a, 61b and 63, 63a, 63b, and when the segments are in the advanced positions thereof, it may be noted that the opposite abutments on the segments are engaged or abutted with adjacent opposed ones of the abutments on other ones of the segments; therefore, such engagements of the abutments define the advanced positions of the segments, respectively.

Upon the movement of segments 33, 33a, 33b into the advanced positions, as discussed above, arcuate seats 35, 35a, 35b on holders 47, 47a, 47b of the segments are disposed with respect to each other in positions defining the predetermined outside diameter D of rotatable assembly 13, and arcuate outer surfaces 27, 27a, 27b of magnet material elements 23, 23a, 23b are urged into locating engagement with the arcuate seats and maintained in such locating engagement by jaws 37, 37a, 37b, respectively, as also previously discussed. Further, the movement of segments 33, 33a, 33b into the advanced positions also serves to space arcuate inner surfaces 25, 25a, 25b of magnet material elements 23, 23a, 23b within the preselected spatial range R from circumferential surface 17 of rotor core 15 in its located position with rotational axis 21 of the rotor core and shaft 19 aligned with preselected axis 31 of apparatus 11. Of course, arcuate inner surfaces 25, 25a, 25b of magnet material elements 23, 23a, 23b may also have high points or areas thereon due to manufacturing tolerance variations in the magnet material elements, but it may be noted that the arcuate inner surfaces of the magnet material elements are predeterminately spaced from circumferential surface 17 of rotor core 15 within the preselected spatial range R when segments 33, 33a, 33b are in the advanced positions, respectively. It has been found that when the tolerance variations between arcuate inner surfaces 25, 25a, 25b and arcuate outer surfaces 27, 27a, 27b of magnet material elements 33, 33a, 33b are at a minimum so that the magnet material elements are relatively thin, the preselected spatial range R may be from generally about 0.002 inches to about 0.003 inches, and when the tolerance variations between the arcuate inner and outer surfaces of the magnet material elements are at a maximum so that the magnet material elements are relatively thick, then preselected spatial range R may be from generally about 0.020 inches to about 0.040 inches. While these variances in preselected spatial range R are believed to be effective in the formation of rotatable assembly 13, it is contemplated that other spatial ranges may be utilized within the scope of the invention so as to meet at least some of the objects thereof. Of course, this predetermined spacing between arcuate inner surfaces 25, 25a, 25b of magnet material elements 23, 23a, 23b and circumferential surface 17 of rotor core 15 obviates engagement to prevent fracturing, cracking or chipping of the magnet material elements and thereby compensates for the aforementioned tolerance variation in the arcs of the arcuate surfaces of the magnet material elements, as well as tolerance variations which may occur in the concentricity of the circumferential surface of the rotor core.

Generally as arcuate inner surfaces 25, 25a, 25b of magnet material elements 23, 23a, 23b are brought into the facing and spaced apart relation within the preselected spatial range R with circumferential surface 17 of rotor core 15, as mentioned above, the beads of hardenable adhesive material 45 on the arcuate inner surfaces of the magnet material elements contact the circumferential surface of the rotor core, and at least a part of the hardenable adhesive material is thereby displaced or flowed from the beaded configuration so as to fill at least the spaces established between the circumferential surface of the rotor core and the arcuate inner surfaces of the magnet material elements. As previously mentioned, circumferential surface 17 of rotor core 15 may be coated with an activator for hardenable adhesive material 45, and within a predetermined period of time after the hardenable adhesive material contacts the activator on the circumferential surface of the rotor core, the hardenable adhesive material will harden in place in the spaces established between arcuate inner surfaces 25, 25a, 25b of magnet material elements 23, 23a, 23b and the circumferential surface of the rotor core to adhere to the magnet material elements. Thus, with magnet material elements 23, 23a, 23b so adhered to rotor core 15 to form rotatable assembly 13, it may be noted that arcuate outer surfaces 27, 27a, 27b of the magnet material elements in the locating engagement with arcuate seats 35, 35a, 35b on segments 33, 33a, 33b define the predetermined outside diameter D of the rotatable assembly and provide a generally constant outer circumferential surface. Thus, regardless of the aforementioned tolerance variations between arcuate inner surfaces 25, 25a, 25b and arcuate outer surfaces 27, 27a, 27b of magnet material elements 23, 23a, 23b, predetermined outside diameter D of rotatable assembly 13 is uniform, accurate and very closely controlled.

Upon the hardening or curing of hardenable adhesive material 45 adhering magnet material elements 23, 23a, 23b to rotor core 15, to form rotatable assembly 13, as discussed above, the rotatable assembly may be removed from apparatus 11 by manually lifting or otherwise displacing the rotatable assembly from the apparatus to disassociate shaft end portion 39 from mounting device 29 and the magnet material elements from jaws 37, 37a, 37b and holders 47, 47a, 47b on segments 33, 33a, 33b of the apparatus. While the placement of rotor core 15 and shaft 19 into the located position in apparatus 11 and the removal of rotatable assembly 13 from the apparatus has been disclosed as being effected manually, it is contemplated that such placement and removal may be effected by various different transfer or robotic equipment associated with the apparatus within the scope of the invention so as to meet at least some of the objects. To complete the description of the method of operating apparatus 11 to assemble rotatable assembly 13, actuators 57, 57a, 57b and 59, 59a, 59b may be further operated to effect the return of jaws 37, 37a, 37b from the locating positions to the at-rest positions and to effect the return of segments 33, 33a, 33b from the advanced positions to the retracted positions, respectively, subsequent to the removal of the rotatable assembly from the apparatus. Thus, regardless of the tolerance variations in the circumferential surface 17 of rotor 15 as may be defined by radius r and the tolerance variation in the thickness t of magnet material elements 23, 23a, 23b, it may be noted that the assembly method of the present invention automatically compensates for such tolerance variations so as to provide a uniform or constant outside diameter on rotatable assembly 13, which outside diameter may be defined by the following equation:

$$OD=2(t+r+R).$$

For instance, any tolerance variation in thickness t of any two of magnet material elements 23, 23a, 23b and any tolerance variation in radius r of rotor 15 measured across any diameter of rotatable assembly 13 will be compensated for by the preselected spatial range R in which arcuate inner surfaces 25, 25a, 25b of magnet material elements 23, 23a, 23b are disposed with respect to circumferential surface 17 of the rotor.

Referring again in general to the drawings and recapitulating at least in part with respect to the foregoing, apparatus 11 is shown in one form of the invention for assembling rotatable assembly 13 (FIGS. 1-7). Rotatable assembly 13 includes rotor core 15 having circumferential surface 17 and secured about shaft 19 with the rotor core and shaft having rotational axis 21, magnet material elements 23, 23a, 23b having arcuate inner surfaces 25, 25a, 25b and arcuate outer surfaces 27, 27a, 27b, and hardenable adhesive material 45 disposed on at least one of the arcuate inner surfaces of the magnet material elements and the circumferential surface of the rotor core, respectively (FIG. 1). In apparatus 11, mounting means 29 has preselected axis 31 for locating engagement with shaft end portion 39 so as to generally align rotational axis 21 of rotor core 15 and shaft 19 with the preselected axis (FIG. 4), and a set of means, such as segments 33, 33a, 33b, is provided for movement generally radially with respect to preselected axis 31 toward the advanced positions (FIGS. 2, 3 and 6). A set of means, such as holders 47, 47a, 47b, are provided on segments or movable means 33, 33a, 33b for receiving magnet material elements 23, 23a, 23b with arcuate inner surfaces 25, 25a, 25b thereof arranged generally in facing relation with circumferential surface 17 of rotor core 15 when shaft end portion 39 is in its locating engagement with mounting means 29, respectively (FIGS. 3-6). Holders or receiving means 47, 47a, 47b include a set of means, such as arcuate seats 35, 35a, 35b or the like for instance, extending generally coaxially about preselected axis 31 for seating in locating engagement arcuate outer surfaces 27, 27a, 27b of magnet material elements 23, 23a, 23b, respectively (FIGS. 2 and 3).

More particularly and with specific reference to FIG. 2, apparatus 11 has a base or base plate 65 on which a set of means, such as guides or guide blocks 67, 67a, 67b or the like for instance, are supported adjacent opposite sides of segments 33, 33a, 33b for supporting the segments and for guiding the segments during their reciprocal movement between the retracted and advanced positions thereof generally radially with respect to preselected axis 31 of the apparatus. The details of guide blocks 67, 67a, 67b and the supporting and guiding engagement thereof with segments 33, 33a, 33b, respectively, are believed to be well known to the art and are omitted for purposes of drawing simplicity and brevity of disclosure.

Mounting means 29 comprises a bushing 69 disposed within an opening 71 provided therefor in base plate 65 of apparatus 11, and the centerline axis of a bore 73 of the bushing defines preselected axis 31 of the apparatus, as best seen in FIG. 4. Thus, when rotor core 15 and shaft 19 are disposed in the located position thereof in apparatus 11, shaft end portion 39 is received in locating engagement within bore 73 of bushing 69 thereby to align rotational axis 21 of the rotor core and shaft with preselected axis 31 of the apparatus. In order to locate rotor core 15 with respect to base plate 65 so that circumferential surface 17 of the rotor core is disposed to receive, in the aforementioned spaced apart relation, magnet material elements 23, 23a, 23b carried by segments 33, 33a, 33b, respectively, means, such as for instance a generally annular spacer 75 or the like, for locating the rotor core from the base plate is interposed therebetween. Thus, mounting means 29 also includes locating means or annular spacer 75 which has a pair of opposite annular ends or end portions 77, 79 respectively seated in engagement with base plate 65 about bushing 69 therein and in engagement with an end face 81 of rotor core 15 when the rotor core and shaft 19 are in the located position thereof in apparatus 11. Of course, different spacers having different axial lengths may be interchanged with spacer 75 to accommodate rotor cores of different stack heights. As previously mentioned, it is contemplated that various other means, such as transfer or robotic equipment for instance, may be associated with apparatus 11 instead of mounting means 29 to maintain rotor core 15 and shaft 19 in the located position thereof in the apparatus.

A set of means, such as for instance arcuate ledges 83, 83a, 83b or the like, are provided on holders 47, 47a, 47b for supporting magnet material elements 23, 23a, 23b therein, and the arcuate ledges extend generally radially and perpendicularly from arcuate seats 35, 35a, 35b on the holders, respectively. Jaws 37, 37a, 37b span about holders 47, 47a, 47b on segments 33, 33a, 33b, and pairs of opposed means, such as guides or guide blocks 85, 85a, 85b or the like for instance, are carried on the segments for supporting or guiding engagement with the opposite sides of the jaws to define the reciprocal movement of the jaws between the at-rest and locating positions thereof, respectively; however, since the jaw guide blocks and the guiding engagements thereof with the jaws are believed to be well known in the art, details of the jaw guide blocks are omitted for the purpose of drawing simplicity and brevity of disclosure. Actuators 57, 57a, 57b are mounted to segments 33, 33a, 33b, and the push rods of said actuators are adjustably connected by suitable means with jaws 37, 37a, 37b. To complete the description of apparatus 11, actuators 59, 59a, 59b are mounted to base plate 65 of the apparatus, and the push rods of the actuators are adjustably connected by suitable means with segments 33, 33a, 33b.

In the operation of apparatus 11, assume that the component parts are in the positions illustrated in FIG. 2 and that rotor core 15 and shaft 19 is in the located position in the apparatus, to effect the alignment of rotational axis 21 of the rotor core and shaft with preselected axis 31 of the apparatus, as best seen in FIG. 4 and as previously discussed. When magnet material elements 23, 23a, 23b with hardenable adhesive material 45 applied are placed in holders 47, 47a, 47b on segments 33, 33a, 33b in the retracted positions, the magnet material elements are supported in the holders being seated against ledges 83, 83a, 83b, and arcuate outer surfaces 27, 27a, 27b of the magnet material elements are disposed at least adjacent and in facing relation with arcuate seats 35, 35a, 35b of the holders, respectively, as best seen in FIG. 3. Further, opposed flanges 53, 53a, 53b and 55, 55a, 55b of jaws 37, 37a, 37b are disposed at least adjacent and in facing relation with opposite marginal edges 49, 49a, 49b and 51, 51a, 51b of the magnet material elements when they are received in holders 47, 47a, 47b, respectively.

Actuators 57, 57a, 57b are initially operated or energized to move jaws 37, 37a, 37b on the guide blocks therefor generally radially outwardly with respect to preselected axis 31 of apparatus 11 from the at-rest positions toward the locating positions thereof, respectively, as best seen in FIG. 5. Thus, actuators 57, 57a, 57b comprise a set of means for moving jaws 37, 37a, 37b between the at-rest and locating positions thereof, respectively. In response to this movement of jaws 37, 37a, 37b toward their locating positions, opposed flanges 53, 53a, 53b and 55, 55a, 55b of the jaws engage opposite marginal edges 49, 49a, 49b and 51, 51a, 51b of magnet material elements 23, 23a, 23b thereby to urge arcuate outer surfaces 27, 27a, 27b of the magnet material elements into locating engagement with arcuate seats 35, 35a, 35b on holders 47, 47a, 47b, respectively. Thus, jaws 37, 37a, 37b not only comprise a set of means for moving or urging magnet material elements 33, 33a, 33b toward their located positions but also comprise a set of means for maintaining or retaining the magnet material elements in their located positions, respectively. With magnet material elements 23, 23a, 23b so located, both arcuate inner surfaces 25, 25a, 25b and arcuate outer surfaces 27, 27a, 27b of the magnet material elements are arranged generally concentrically and in radially spaced relation with respect to circumferential surface 17 of rotor core 15 in the located position thereof.

Actuators 59, 59a, 59b are initially actuated or energized to move segments 33, 33a, 33b on guide blocks 67, 67a, 67b therefor generally radially inwardly with respect to preselected axis 31 of apparatus 11 from the retracted positions of the segments toward the advanced positions thereof, and such movement of the segments is predeterminately terminated at their advanced positions in response to the engagement of opposite abutments 61, 61a, 61b and 63, 63a, 63b on the segments with adjacent opposed ones of the abutments, respectively, as best seen in FIGS. 6 and 7. Thus, actuators 59, 59a, 59b comprise a set of means for moving segments 33, 33a, 33b between their retracted and advanced positions, respectively. Upon this movement of segments 33, 33a, 33b into their advanced positions, arcuate inner surfaces 25, 25a, 25b of magnet material elements 23, 23a, 23b are spaced within the preselected spatial range R from circumferential surface 17 of rotor core 15, and the beads of hardenable adhesive material 45 on the arcuate inner surfaces of the magnet material elements contact the circumferential surface of the rotor core thereby to be dispersed so as to fill at least the spaces established between the circumferential surface of the rotor core and the arcuate inner surfaces of the magnet material elements. Thus, segments 33, 33a, 33b comprise a set of means for advancing magnet material elements 23, 23a, 23b toward their assembly positions wherein arcuate inner surfaces 25, 25a, 25b are spaced in preselected spatial range R from circumferential surface 17 of rotor core 15, respectively. Hardenable adhesive material 45, of course, hardens in place within the spaces established between circumferential surface 17 of rotor core 15 and arcuate inner surfaces 25, 25a, 25b of magnet material elements 23, 23a, 23b thereby to adhere the magnet material elements to the rotor core forming rotatable assembly 13. With hardenable adhesive material 45 so hardened, rotatable assembly 13 may be displaced from apparatus 11 thereby to remove shaft end portion 39 from bore 73 of bushing 69 in base plate 65 of the apparatus and to disassociate magnet material elements 23, 23a, 23b from jaws 37, 37a, 37b and holders 47, 47a, 47b on segments 33, 33a, 33b of the apparatus. To complete the description of the operation of apparatus 11, actuators 57, 57a, 57b and 59, 59a, 59b may be further actuated to return jaws 37, 37a, 37b to their at-rest positions and to return segments 33, 33a, 33b to their retracted positions, respectively, after rotatable assembly 13 is removed from the apparatus.

With reference again in general to the drawing in general and again recapitulating at least in part with respect to the foregoing, there is illustrated in one form of the invention a method of assembling rotatable assembly 13 with respect to reference axis 31 (FIGS. 2-7). Rotatable assembly 13 has preselected outside diameter D and includes rotor core 15 having circumferential surface 17 thereon, and magnet material elements 23, 23a, 23b having arcuate inner surfaces 25, 25a, 25b and arcuate outer surfaces 27, 27a, 27b, and the rotatable assembly also has preselected spatial range R between the circumferential surface of the rotor core and the arcuate inner surfaces of the magnet material elements, respectively (FIGS. 1 and 6). In practicing this method, rotor core 15 is disposed so that circumferential surface 17 thereof is at least generally coaxial with reference axis 31, and arcuate outer surfaces 27, 27a, 27b of magnet material elements 23, 23a, 23b are located in preselected positions at least generally concentrically about the reference axis with arcuate inner surfaces 25, 25a, 25b of the magnet material elements facing the circumferential surface of the rotor core, respectively (FIG. 5). Arcuate outer surfaces 27, 27a, 27b of magnet material elements 23, 23a, 23b, while located in the preselected positions thereof, are arranged with respect to rotor core 15 so as to define preselected outside diameter D of rotatable assembly 13, and arcuate inner surfaces 25, 25a, 25b of the magnet material elements are thereby located in spaced apart relation from circumferential surface 17 of the rotor core at least within preselected spatial range R therebetween, respectively (FIGS. 6 and 7).

Further, rotatable assembly 13 in one form of the invention has rotor 15 with a circumferential surface 17 thereon, and magnet material elements 23, 23a, 23b are arranged about the circumferential surface of the rotor (FIGS. 1 and 6). Magnet material elements 23, 23a, 23b include generally arcuate outer surfaces 27, 27a, 27b defining a generally constant outer circumference of rotatable assembly 13 and generally arcuate inner surfaces 25, 25a, 25b predeterminately spaced from circumferential surface 17 of rotor 15, respectively (FIG. 1). Hardenable adhesive material 45 fills at least the spaces between arcuate inner surfaces 25, 25a, 25b of magnet material elements 23, 23a, 23b and circumferential surface 17 of rotor 15 to secure the magnet material elements thereto, respectively.

From the foregoing, it is now apparent that a novel apparatus 11, a novel method of operating such apparatus and a novel method of assembling rotatable assembly 13 have been presented meeting the objects set out hereinbefore, as well as others, and it is contemplated that changes as to the precise arrangements, shapes, details and connections of the component parts utilized in such apparatus and methods and also as to the precise steps and order thereof of such methods may be made by those having ordinary skill in the art without departing from the spirit of the invention or from the scope of the invention which is set out by the claims which follow.

What I claim as new and desire to secure by Letters Patent of the United States is:

1. A method of assembling a rotatable assembly for a dynamoelectric machine with respect to a preselected reference axis, the rotatable assembly having a preselected outside diameter and including a rotor core having a circumferential surface and secured about a shaft therefor with the rotor core and shaft having a rotational axis, and a set of magnet material elements having generally arcuate inner and outer surfaces, respectively, and the rotatable assembly also having a preselected spatial range between the circumferential surface of the rotor core and the arcuate inner surfaces of the magnet material elements, respectively, the method comprising the steps of:
   applying a hardenable adhesive material onto at least one of the arcuate inner surfaces of the magnet material elements and the circumferential surface of the rotor core, respectively;
   arranging the rotational axis of the rotor core and the shaft at least generally in alignment with the preselected reference axis;
   locating the arcuate outer surfaces of the magnet material elements in positions at least generally coaxially about the preselected reference axis and disposing the arcuate inner surfaces of the magnet material elements in facing relation about the circumferential surface of the rotor core, respectively;
   moving the magnet material elements at least generally radially with respect to the preselected reference axis toward the circumferential surface of the rotor core and maintaining the arcuate outer surfaces of the magnet material elements in the located positions thereof, respectively;
   positioning the magnet material elements in assembly relation with the rotor core so that the arcuate outer surfaces of the magnet material elements in their located positions at least generally define the outside diameter of the rotatable assembly upon the movement of the magnet material elements toward the circumferential surface of the rotor core and spacing thereby the arcuate inner surfaces of the magnet material elements within the preselected spatial range from the circumferential surface of the rotor core, respectively;
   flowing the hardenable adhesive material at least in part to at least fill the space established between the arcuate inner surfaces of the magnet material elements and the circumferential surface of the rotor core in response to the positioning and spacing step; and
   hardening the hardenable adhesive material.

2. A method of assembling a rotatable assembly for a dynamoelectric machine with respect to a preselected reference axis, the rotatable assembly having a preselected outside diameter and including a rotor core having a circumferential surface, and a set of magnet material elements having generally arcuate inner and outer surfaces, respectively, and the rotatable assembly also having a preselected spatial range between the circumferential surface of the rotor core and the arcuate inner surfaces of the magnet material elements, the method comprising the steps of:
   disposing the core so that the circumferential surface thereof is at least generally coaxially arranged about the preselected reference axis;
   arranging the magnet material elements generally about the preselected reference axis in spaced relation therewith and locating the arcuate outer surfaces of the magnet material elements in positions at least generally coaxially with the preselected reference axis with the arcuate inner surfaces of the magnet material elements in facing relation with the circumferential surface of the rotor core, respectively; and
   moving the magnet material elements into assembly relation with the rotor core so that the arcuate outer surfaces of the magnet material elements in their located positions at least generally define the preselected outside diameter of the rotatable assembly and locating thereby the arcuate inner surfaces of the magnet material elements in spaced apart relation with the circumferential surface of the rotor core at least within the preselected spatial range therebetween, respectively.

3. The method as set forth in claim 2 wherein the moving and locating step includes displacing the magnet material elements at least generally radially inwardly toward the circumferential surface of the rotor core, respectively.

4. The method as set forth in claim 3 wherein the displacing step includes maintaining the arcuate outer surfaces of the magnet material elements in the located positions thereof.

5. The method as set forth in claim 2 comprising the preliminary step of applying a hardenable adhesive material onto at least one of the circumferential surface of the rotor core and the arcuate inner surfaces of the magnet material elements in an amount at least great enough to fill the space established during the moving and locating step between the circumferential surface of the rotor core and the arcuate inner surfaces of the magnet material elements in the spaced apart relation thereof within the preselected spatial range.

6. The method as set forth in claim 5 comprising the additional step of displacing at least a part of the hardenable adhesive material in response to the moving and locating step to at least effect the filling of the space established between the circumferential surface of the core and the arcuate inner surfaces of the magnet material elements, respectively.

7. The method as set forth in claim 5 comprising the additional step of hardening the hardenable adhesive material.

8. A method of assembling a rotatable assembly for a dynamoelectric machine with respect to a reference axis, the rotatable assembly having a preselected outside diameter and including a rotor core having a circumferential surface, and a set of magnet material elements having generally arcuate inner and outer surfaces, respectively, and the rotatable assembly also having a preselected spatial range between the circumferential surface of the rotor core and the arcuate inner surfaces of the magnet material elements, the method comprising the steps of:

disposing the rotor core so that the circumferential surface thereof is at least generally coaxial with the reference axis and locating the arcuate outer surfaces of the magnet material elements in preselected positions at least generally concentrically about the reference axis with the inner surfaces of the magnet material elements facing the circumferential surface of the rotor core, respectively; and arranging the arcuate outer surfaces of the magnet material elements while located in the preselected positions thereof with respect to the rotor core so as to define the preselected outside diameter of the rotatable assembly and locating thereby the arcuate inner surfaces of the magnet material elements in spaced apart relation from the circumferential surface of the rotor core at least within the preselected spatial range therebetween, respectively.

9. The method as set forth in claim 8 comprising the intermediate step of moving the magnet material elements at least generally radially toward the circumferential surface of the rotor core, respectively.

10. The method as set forth in claim 9 comprising the further intermediate step of maintaining the arcuate outer surfaces of the magnet material elements in the located positions thereof at least during the moving step, respectively.

11. The method as set forth in claim 8 comprising the preliminary step of applying an adhesive material onto at least one of the circumferential surface of the rotor core and the arcuate inner surfaces of the magnet material elements in an amount at least great enough to at least fill the space established between the circumferential surface of the rotor core and the arcuate inner surfaces of the magnet material elements during the arranging and locating step.

12. The method as set forth in claim 11 comprising the additional step of flowing the hardenable material at least in part to at least effect the filling of the space established between the circumferential surface of the rotor core and the arcuate inner surfaces of the magnet material elements during the arranging and locating step.

13. The method as set forth in claim 12 comprising the additional step of curing the hardenable adhesive material.

14. Apparatus for assembling a rotatable assembly having a rotational axis and adapted for use in a dynamoelectric machine, the rotatable assembly including a rotor core having a circumferential surface and secured about a shaft therefor and with the rotor core and the shaft having a rotational axis, a set of magnet material elements respectively having generally arcuate inner and outer surfaces interposed between a pair of opposite marginal edges, and a hardenable adhesive material disposed on at least one of the arcuate inner surfaces of the magnet material elements and the circumferential surface of the rotor core, the apparatus comprising:

a base;

mounting means having a preselected axis associated with said base and arranged for locating engagement with a part of the shaft so as to generally align the rotational axis of the rotor core and the shaft with the preselected axis;

a set of segments reciprocably movable on said base generally radially with respect to the preselected axis between retracted and advanced positions, respectively;

a pair of generally opposite abutment means on said segments for engagement with adjacent opposed ones of said abutment means on said segments to define the advanced positions thereof, respectively;

a set of means on said segments for receiving the magnet material elements with the inner arcuate surfaces thereof arranged generally in facing relation with the circumferential surface of the rotor core when the shaft part is in its locating engagement with said mounting means, respectively, said receiving means including a set of generally arcuate locating surfaces extending generally coaxially about the preselected axis and arranged to seat in locating engagement the arcuate outer surfaces of the magnet material elements, respectively;

a set of jaws on said segments and movable both conjointly with said segments and relative to said segments and said receiving means between at-rest and locating positions, respectively, said jaws including a pair of generally opposed flanges arranged to engage with the opposite marginal edges of the magnet material elements when the magnet material elements are in said receiving means therefor, respectively;

a set of means on said segments for moving said jaws relative thereto from the at-rest positions toward the locating positions of said jaws to engage said opposed flanges thereof with the opposite marginal edges of the magnet material elements and urge the arcuate outer surfaces of the magnet material elements into locating engagement with said locating surfaces on said receiving means, respectively; and another set of means on said base for moving said segments from the retracted positions toward the advanced positions thereof, said receiving means with the magnet material elements therein and said jaws being conjointly movable with said segments to space the arcuate inner surfaces of the magnet material elements within a preselected spatial range from the circumferential surface of the rotor core with the hardenable adhesive material at least filling the space between the arcuate inner surfaces of the magnet material elements and the circumferential surface of the rotor core when said segments are in the advanced positions thereof with said abutment means on said segments engaging said adjacent opposed ones of said abutment means, respectively.

15. Apparatus for assembling a rotatable assembly having a rotational axis and adapted for use in a dynamoelectric machine, the rotatable assembly including a rotor core secured to a shaft therefor and having a circumferential surface, a set of magnet material elements respectively having generally arcuate inner and outer surfaces, and a hardenable material disposed on at least one of the inner surfaces of the magnet material elements and the circumferential surface of the rotor core, the apparatus comprising:

mounting means having a preselected axis and arranged for locating engagement with a part of the shaft so as to generally align the rotational axis of the rotatable assembly with the preselected axis;

a set of means for movement generally radially with respect to the preselected axis toward an advanced position; and a set of means on said movement means for receiving the magnet material elements with the arcuate inner surfaces thereof arranged generally in facing relation with the circumferential surface of the rotor core when the shaft part is in the locating engagement with said mounting means, respectively, said receiving means including a set of means extending generally coaxially about the preselected axis for seating in locating engagement the arcuate outer surfaces of the magnet material elements, respectively.

16. The apparatus as set forth in claim 15 further comprising a set of means associated with said seating means for maintaining the arcuate outer surfaces of the magnet material elements in the locating engagement thereof with said seating means, respectively.

17. The apparatus as set forth in claim 15 further comprising a set of means on said movement means and operable generally to engage the magnet material elements for urging the arcuate outer surfaces of the magnet material elements into the locating arrangements thereof with said seating means, respectively.

18. The apparatus as set forth in claim 17 wherein said urging means comprise a set of jaws on said movement means and movable both conjointly with said movable means and relative to said movement means and said seating means, said jaws including a pair of generally opposed flanges arranged to engage the magnet material elements when the magnet material elements are in the receiving means therefor, respectively.

19. The apparatus as set forth in claim 17 further comprising a set of means operable generally for actuating said urging means to maintain the arcuate outer surfaces of the magnet material elements in the located engagements thereof with said seating means, respectively.

20. The apparatus as set forth in claim 15 further comprising a set of means operable generally for actuating said movement means toward the advanced positions thereof so as to space the arcuate inner surfaces of the magnet material elements within a preselected spatial range from the circumferential surface of the rotor core with the hardenable adhesive material at least filling the space between the arcuate inner surfaces of the magnet material elements and the circumferential surface of the rotor core, respectively.

21. The apparatus as set forth in claim 15 wherein said movement means include a pair of generally opposite abutment means for engagement with adjacent opposed ones of said abutment means when said movement means are in the advanced positions thereof, respectively.

22. Apparatus for assembling a rotatable assembly having a preselected diameter about a rotational axis thereof and adapted for use in a dynamoelectric machine, the rotatable assembly including a rotor core secured about a shaft therefor and having a generally cylindric circumferential surface, a set of magnet material elements respectively having generally arcuate inner and outer surfaces, and a hardenable adhesive material disposed on at least one of the arcuate inner surfaces of the magnet material elements and the circumferential surface of the rotor core, the apparatus comprising:

mounting means defining a preselected axis in the apparatus and arranged for locating engagement with a part of the shaft so as to generally align the rotational axis of the rotatable assembly with the preselected axis;

a set of means arranged about the preselected axis for movement generally radially thereof between retracted and advanced positions and including a set of generally arcuate seating means for locating engagement with the arcuate outer surfaces of the magnet material elements with the arcuate inner surfaces thereof being arranged generally about the circumferential surface of rotor core when said movement means are in the retracted positions thereof, and said arcuate seating means being sized to define the preselected diameter of the rotatable assembly when said movement means are in the advanced positions thereof, respectively; and a set of means for actuating said movement means from the retracted positions into the advanced positions thereof to predeterminately space the arcuate inner surfaces of the magnet material elements within a preselected spatial range from the circumferential surface of the rotor core with the hardenable adhesive material at least filling the space between the arcuate inner surfaces of the magnet material elements and the circumferential surface of the rotor core and with the arcuate outer surfaces of the magnet material elements in the locating engagement thereof with said arcuate seating means defining the preselected diameter of the rotatable assembly, respectively.

23. Apparatus for assembling a rotatable assembly adapted for use in a dynamoelectric machine, the rotatable assembly having a rotational axis and including a rotor core secured about a shaft therefor and having a circumferential surface, a set of magnet material elements respectively having generally arcuate inner and outer surfaces, and a hardenable adhesive material disposed on at least one of the arcuate inner surfaces of the magnet material elements and the circumferential surface of the rotor core, the apparatus comprising:

mounting means having a preselected axis and arranged for locating engagement with a part of the shaft so as to generally align the rotational axis of the rotatable assembly with the preselected axis; and a set of means operable generally for advancing the magnet material elements toward assembly positions to space the arcuate inner surfaces thereof within a preselected spatial range from the circumferential surface of the rotor core with the hardenable adhesive material at least filling the spaces therebetween when the shaft part is in the locating engagement with said mounting means, said advancing means including a set of means for seating the arcuate outer surfaces of the magnet material elements in located positions generally coaxially about the reference axis, respectively, and a set of means movable relative to said seating means for urging the arcuate outer surfaces of the magnet material elements toward the located positions thereof on said seating means.

24. The apparatus as set forth in claim 23 wherein said advancing means further include a set of means associated with said seating means for retaining the arcuate outer surfaces of the magnet material elements in the located positions thereof on said seating means, respectively.

25. A method of operating apparatus for assembling a rotatable assembly adapted for use in a dynamoelectric machine, the rotatable assembly having a predetermined outside diameter and including a rotor core having a generally cylindric circumferential surface and secured about a shaft with the rotor core and shaft having a rotational axis, a set of magnet material elements respectively having generally arcuate inner and outer surfaces interposed between a pair of opposite marginal edges, and a hardenable adhesive material, the apparatus having a mounting device with a preselected axis, first and second sets of actuators, a set of segments movable between retracted and advanced positions and each having a pair of generally opposite abutments, the segments including a set of holders with generally arcuate seats sized to define the outside diameter of the rotatable assembly, and a set of jaws movable between at-rest and locating positions and each having a pair of generally opposed flanges, respectively, the method comprising the steps of:

applying the hardenable adhesive material onto at least one of the circumferential surfaces of the rotor core and the arcuate inner surfaces of the magnet material elements;

associating a part of the shaft with the mounting device;

aligning the rotational axis of the rotor core and shaft with the preselected axis of the mounting device in response to the associating step;

placing the magnet material elements in the holders on the segments when the segments are in the retracted position thereof with the arcuate outer surfaces of the magnet material elements facing the arcuate seats on the holders and the arcuate inner surfaces of the magnet material elements facing the circumferential surface of the rotor core when the shaft part is associated with the mounting device, respectively;

actuating the first actuators and moving the jaws from the at-rest positions toward the locating positions thereof relative to the segments and the holders, respectively;

engaging the opposed flanges on the jaws with the opposite marginal edges of the magnet material elements urging thereby the arcuate outer surfaces of the magnet material elements into locating engagement with the arcuate seats on the holders in response to the movement of the jaws toward the locating positions thereof during the actuating and moving stop, respectively;

actuating the second actuators and driving the segments generally radially with respect to the preselected axis from the retracted positions of the segments toward the advanced positions thereof, respectively;

engaging the opposite abutments on the segments with adjacent opposed ones of the abutments on the segments when the segments are in the advanced positions thereof, respectively; disposing the arcuate seats in positions defining the predetermined outside diameter of the rotatable assembly with the arcuate outer surfaces of the magnet material elements in the locating engagements thereof with the arcuate seats and spacing the arcuate inner surfaces of the magnet material elements within a preselected spatial range from the circumferential surface of the rotor core when the segments are in the advanced positions thereof, respectively;

displacing at least a part of the hardenable adhesive material on the at least one of the circumferential surface of the rotor core and the arcuate inner surfaces of the magnet material elements and at least filling thereby the spaces established between the circumferential surface of the rotor core and the arcuate inner surfaces of the magnet material elements during the disposing and spacing step;

hardening the hardenable adhesive material and adhering thereby the arcuate inner surfaces of the magnet material elements in the spaced relation thereof to the circumferential surface of the rotor core and with the arcuate outer surfaces of the magnet material elements defining the predetermined outer diameter of the rotatable assembly;

disassociating the shaft part from the mounting device and the magnet material elements from the holders therefor and removing the rotatable assembly from the apparatus; and actuating further the first and second actuators to return the jaws to the at-rest positions thereof and the segments to the retracted positions thereof, respectively.

26. A method of operating apparatus for assembling a rotatable assembly adapted for use in a dynamoelectric machine, the rotatable assembly having a predetermined outside diameter and including a rotor core having a circumferential surface and secured about a shaft with the rotor core and the shaft having a rotational axis, and a set of magnet material elements respectively having generally arcuate inner and outer surfaces, the apparatus having a mounting device with a preselected axis, first and second sets of actuators, and a set of segments including a set of arcuate seats sized to define the predetermined outside diameter of the rotatable assembly, and a set of jaws, respectively, the method comprising the steps of:

associating a part of the shaft with the mounting device thereby to at least generally align the rotational axis of the rotor core and shaft with the preselected axis of the mounting device;

placing the magnet material elements on the segments with the arcuate outer surfaces thereof arranged generally in facing relation with the arcuate seats and with the arcuate inner surfaces of the magnet material elements arranged generally in facing relation with the circumferential surface of the rotor core, respectively;

actuating the first actuators and moving thereby the jaws relative to the segments so as to engage the jaws with the magnet material elements and urge the arcuate outer surfaces thereof into locating engagement with the arcuate seats on the segments, respectively;

actuating the second actuators and driving thereby the segments generally radially with respect to the preselected axis toward preselected positions generally adjacent the rotor core, respectively; and disposing the arcuate seats on the segments in positions defining the predetermined outside diameter of the rotatable assembly with the arcuate outer surfaces of the magnet material elements in the locating engagements thereof with the arcuate seats and spacing the arcuate inner surfaces of the magnet material elements within a preselected spatial range from the circumferential surface of the rotor core when the segments are in the preselected positions thereof, respectively.

27. The method as set forth in claim 26 wherein the rotatable assembly further includes a hardenable adhesive material and wherein the method comprises the preliminary step of applying the hardenable adhesive material to at least one of the circumferential surface of the rotor core and the arcuate inner surfaces of the magnet material elements in an amount at least great enough to fill the space established between the circumferential surface of the rotor core and the arcuate inner surface of the magnet material elements during the disposing and spacing step.

28. The method as set forth in claim 27 comprising the additional step of hardening the hardenable material so as to secure the magnet material elements to the circumferential surface of the rotor core thereby to form the rotatable assembly with the predetermined outside diameter thereof being defined by the arcuate outer surfaces of the magnet material elements, respectively.

29. The method as set forth in claim 26 wherein the segments include a pair of generally opposite abutments and wherein the actuating step includes engaging the opposite abutments on the segments with adjacent opposed abutments thereof when the segments are in the preselected positions thereof, respectively.

30. A method of operating apparatus for assembling a rotatable assembly adapted for use in a dynamoelectric machine, the rotatable assembly having a predetermined outside diameter and including a rotor core having a circumferential surface and secured about a shaft with the rotor core and shaft having a rotational axis, and a set of magnet material elements respectively having generally arcuate inner and outer surfaces, the apparatus having a mounting device with a preselected axis, and a set of segments movable generally radially with respect to the preselected axis between retracted and advanced positions, the segments including a set of arcuate seats sized to define the predetermined outside diameter of the rotatable assembly, and a set of jaws movable on the segments, the method comprising the steps of:

associating a part of the shaft with the mounting device thereby to at least generally align the rotational axis of the rotor core and shaft with the reference axis of the mounting device;

placing the magnet material elements on the segments with the arcuate outer surfaces thereof at least adjacent the arcuate seats on the segments and with the arcuate inner surfaces of the magnet material elements arranged generally in facing relation with the circumferential surface of the rotor core when the segments are in the retracted positions thereof, respectively;

moving the jaws to engage the magnet material elements and urging thereby the arcuate outer surfaces of the magnet material elements into locating engagement with the arcuate seats on the segments, respectively;

driving the segments from the retracted positions thereof generally radially with respect to the preselected axis toward the advanced positions of the segments, respectively; and spacing the arcuate inner surfaces of the magnet material elements within a preselected spatial range from the circumferential surface of the rotor core when the segments are in the advanced positions thereof, respectively.

31. The method as set forth in claim 30 wherein the segments further include a set of means operable generally for maintaining the arcuate outer surfaces of the magnet material elements in the locating engagements thereof with the arcuate seats on the segments, respectively, and wherein the method comprises the intermediate step of disengaging the jaws from the magnet material elements and effecting the operation of the maintaining means, respectively.

32. The method as set forth in claim 30 wherein the rotatable assembly further includes a hardenable adhesive material and wherein the method comprises the preliminary step of applying a preselected amount of the hardenable adhesive material onto at least one of the circumferential surface of the rotor core and the arcuate inner surfaces of the magnet material elements with the preselected amount of the hardenable adhesive material being at least great enough to fill the space established between the circumferential surface of the rotor core and the arcuate inner surfaces of the magnet material elements in response to the spacing step.

33. The method as set forth in claim 32 further comprising the additional step of hardening the hardenable adhesive material.

34. The method as set forth in claim 30 further comprising the intermediate step of disposing the arcuate seats on the segments in positions with respect to each other so that the arcuate outer surfaces of the magnet material elements in the locating engagements thereof with the arcuate seats defining the predetermined outside diameter of the rotatable assembly when the segments are in the advanced positions thereof, respectively.

35. Apparatus for assembling a rotatable assembly adapted for use in a dynamoelectric machine, the rotatable assembly having a rotational axis and including a rotor core secured about a shaft therefor and having a circumferential surface, a set of magnet material elements respectively having generally arcuate inner and outer surfaces, and a hardenable adhesive material disposed on at least one of the arcuate inner surfaces of the magnet material elements and the circumferential surface of the rotor core, the apparatus comprising:

mounting means having a preselected axis and arranged for locating engagement with a part of the shaft so as to generally align the rotational axis of the rotatable assembly with the preselected axis;

a set of means operable generally for advancing the magnet material elements toward assembly positions to space the arcuate inner surfaces thereof within a preselected spatial range from the circumferential surface of the rotor core with the hardenable adhesive material at least filling the spaces therebetween when the shaft part is in the locating engagement with said mounting means, said advancing means including a set of means for seating the arcuate outer surfaces of the magnet material elements in located positions generally coaxially about the reference axis; and a set of means for displacing said urging means from the magnet material elements when the arcuate outer surfaces of the magnet material elements are in the located positions thereof on said seating means, respectively.

36. Apparatus for assembling a rotatable assembly adapted for use in a dynamoelectric machine, the rotatable assembly having a rotational axis and including a rotor core secured about a shaft therefor and having a circumferential surface, a set of magnet material elements respectively having generally arcuate inner and outer surfaces, and a hardenable adhesive material disposed on at least one of the arcuate inner surfaces of the magnet material elements and the circumferential surface of the rotor core, the apparatus comprising:

mounting means having a preselected axis and arranged for locating engagement with a part of the shaft so as to generally align the rotational axis of the rotatable assembly with the preselected axis;

a set of means operable generally for advancing the magnet material elements toward assembly positions to space the arcuate inner surfaces thereof within a preselected spatial range from the circumferential surface of the rotor core with the hardenable adhesive material at least filling the spaces therebetween when the shaft part is in the locating engagement with said mounting means, said advancing means including a set of means for seating the arcuate outer surfaces of the magnet material elements in located positions generally coaxially about the reference axis; and a pair of generally opposite abutment means for engagement with adjacent opposed ones of said abutment means when the arcuate inner surfaces of the magnet material elements are spaced within the preselected spatial range from the circumferential surface of the rotor core, respectively.

* * * * *